United States Patent
Jahan et al.

(10) Patent No.: US 9,052,379 B2
(45) Date of Patent: Jun. 9, 2015

(54) MULTI-CHANNEL RECEPTION SYSTEM

(75) Inventors: Daniel Jahan, Bohars (FR); Cedric Cornu, Brest (FR)

(73) Assignee: Thales, Courbevoie (FR)

( * ) Notice: Subject to any disclaimer, the term of this patent is extended or adjusted under 35 U.S.C. 154(b) by 317 days.

(21) Appl. No.: 13/511,628

(22) PCT Filed: Nov. 24, 2010

(86) PCT No.: PCT/EP2010/068151
§ 371 (c)(1),
(2), (4) Date: May 23, 2012

(87) PCT Pub. No.: WO2011/064269
PCT Pub. Date: Jun. 3, 2011

(65) Prior Publication Data
US 2012/0242543 A1    Sep. 27, 2012

(30) Foreign Application Priority Data
Nov. 24, 2009 (FR) .................................. 09 05641

(51) Int. Cl.
*G01S 3/16* (2006.01)
*G01S 3/28* (2006.01)
*G01S 3/04* (2006.01)
*G01S 3/50* (2006.01)

(52) U.S. Cl.
CPC .. *G01S 3/043* (2013.01); *G01S 3/50* (2013.01)

(58) Field of Classification Search
CPC ............... G01S 3/16; G01S 3/28; G01S 3/43; H01Q 3/22; H01Q 3/00
USPC .................................. 342/383, 382, 375, 377
See application file for complete search history.

(56) References Cited

U.S. PATENT DOCUMENTS

| 6,446,025 | B1 * | 9/2002 | Nakamura et al. | 702/159 |
| 6,600,774 | B1 * | 7/2003 | Otto | 375/139 |
| 6,628,969 | B1 * | 9/2003 | Rilling | 455/561 |
| 6,828,935 | B1 * | 12/2004 | Dunn et al. | 342/375 |
| 2010/0111239 | A1 * | 5/2010 | Khayrallah et al. | 375/349 |

FOREIGN PATENT DOCUMENTS

| DE | 10163455 A1 | 8/2003 |
| DE | 102008004474 A1 | 7/2009 |
| EP | 0298845 A1 | 1/1989 |
| WO | 2006/110260 A1 | 10/2006 |

* cited by examiner

*Primary Examiner* — Harry Liu
(74) *Attorney, Agent, or Firm* — Baker & Hostetler LLP

(57) ABSTRACT

A reception system including a receiver coupled to a processing means, the receiver comprising a number N of antennas, each being able to pick up signals representative of incident waves and to deliver a pulse dependent on said signal, N being an integer. Said receiver includes: N delay lines respectively coupled to each of said N antennas, each delay line being able to delay the signal delivered by the antenna with which it is associated by its own time delay, a coupling means able to sum the N signals delivered by the N delay lines, so as to deliver an output signal comprising a series of N time-shifted pulses. The processing means includes a measurement means able to measure the signal delivered by the coupling means and to deliver as output a signal formed by measurement samples, representative of the N pulses delivered by the N antennas.

9 Claims, 2 Drawing Sheets

MULTI-CHANNEL RECEPTION SYSTEM

CROSS-REFERENCE TO RELATED APPLICATIONS

This application is a National Stage of International patent application PCT/EP2010/068151, filed on Nov. 24, 2010, which claims priority to foreign French patent application No. FR 09 05641, filed on Nov. 24, 2009, the disclosures of each of which are incorporated by reference in their entireties.

FIELD OF THE DISCLOSED SUBJECT MATTER

The invention pertains to multichannel reception systems, that is to say those that are able to pick up the incident waves with the aid of an antenna array. There are then as many signals of interest, that is to say carriers of information sought, as antennas, if it is desired to acquire the entirety of the information instantaneously.

The invention is particularly suited to multichannel reception systems termed instantaneous wideband or restricted instantaneous band.

When the reception system is instantaneous wideband, this signifies that the N reception channels corresponding to the N antennas of the array can instantaneously cover the entirety of the required frequency coverage (for example of the order of 10 to 20 GHz).

BACKGROUND

When the reception system is restricted instantaneous band (for example of the order of several hundred MHz), this signifies that the N reception channels corresponding to the N antennas of the array must perform a frequency sweep over time so as to fully scan the entirety of the required frequency coverage.

These multichannel reception systems with or without restricted instantaneous band, are particularly suited for performing goniometry. They are capable of measuring the direction of arrival of a given incident wave. A particular feature of the incident wave may be brevity, for example pulse-amplitude-modulated signals with a relatively low shape factor (such as those emitted by radars). It is then appropriate to be able to perform the goniometry in a very short time, and therefore, to measure the set of signals delivered by the goniometric antenna array very rapidly and in parallel.

Accordingly, the aforementioned multichannel reception systems advantageously comprise a receiver produced on the basis of arrays of antennas:
either off-boresighted (array of directional antennas generally equidistributed in angle in the plane of measurement of the direction of arrival of the incident waves), said receiver is then coupled to a measurement means able to use the power of the signals delivered by the antenna array,
or delocalized (antenna array which is generally locally linear and sparse in the plane of measurement of the direction of arrival) and said receiver is then coupled to a measurement means able to use the distribution of path length differences which arises from the antenna array.

Of course, these examples are not limiting.

An instantaneous wideband multichannel reception system (here N channels), can therefore acquire N signals arising from the N antennas of the array.

Accordingly, it is furnished with as many amplitude analyzers as channels, so as to measure the power of the incident wave on each channel. The distribution of these powers over the N channels makes it possible to calculate a direction of arrival parameter, calculated by virtue of a so-called amplitude goniometry estimator.

Furthermore, the technical analysis of the signal requires the measurement of its frequency, the latter being the same on each channel and for the sake of simplification, a single frequency meter is generally used. Under these conditions, a combining means is employed, the role of which is to deliver just a single signal on the basis of the N, to the lone frequency meter.

Today, this combiner function takes various rather unsatisfactory forms. It may involve a simple microwave coupler with N input channels. This has the defect of effecting the vector addition of N channels with non-controllable phases. The consequence is that the signal output by said combiner may be cancelled out through phase opposition of the input signals. As a variant, it may involve systems mixing the coupling of certain channels and the multiplexing of the coupled outputs by switching. This solution has the defect of affecting the integrity of the signal.

It is noted that the aforementioned multichannel reception systems may furthermore possess means able to perform a frequency resolution of the signals received by the antennas. One then speaks of a reception system with spectral analysis of restricted instantaneous band, this restriction being effected by reception chains of superheterodyne type.

A disadvantage of the instantaneous wideband multichannel reception systems (no frequency resolution) described hereinabove is the amount of hardware required (an amplitude analyzer per channel) and therefore the bulkiness, the cost of the system to a certain extent. Moreover, the aforementioned combiner function induces numerous technical snags.

Another major disadvantage of the spectral analysis multichannel reception systems of the prior art is the amount of hardware (a spectral analyzer per channel) and therefore the bulkiness and the cost of the system.

SUMMARY

An aim of the invention is notably to solve the aforementioned problems.

For this purpose, according to a first aspect of the invention, there is proposed a reception system comprising a receiver coupled to a processing means, the receiver comprising a number N of antennas, each being able to pick up signals representative of incident waves and to deliver a pulse dependent on said signal, N being an integer.

According to a general characteristic of this first aspect, said receiver comprises:
N delay lines respectively coupled to each of said N antennas, each delay line being able to delay the signal delivered by the antenna with which it is associated by its own time delay,
a coupling means able to sum the N signals delivered by the N delay lines, so as to deliver an output signal comprising a series of N time-shifted pulses.

Furthermore, the processing means comprises a measurement means able to measure the signal delivered by the coupling means and to deliver as output a signal formed by measurement samples, representative of the N pulses delivered by the N antennas.

Stated otherwise, by virtue of temporal multiplexing, a single signal is formed. This signal is formed of the pulses received temporally sequenced in series.

The advantage of this signal is to make it possible to dispense with the combiner used in the solutions of the prior art.

The structure of the reception system is thus greatly simplified and therefore less expensive during its production.

Moreover, the advantage of the proposed reception system is that it is very reliable as regards the preservation of the integrity of the processed signal.

According to one embodiment, said processing means can furthermore comprise:
a means for technical characterization of the pulses, coupled at the output of the measurement means, able to technically analyze each pulse on the basis of the measurement samples, an auxiliary means able to group together the technical analysis signals delivered by the means for technical characterization corresponding to one and the same incident wave.

Preferably, the processing means can furthermore comprise a means for consolidated and goniometric technical characterization of the pulses, able on the basis of the grouped technical analyses, delivered by said auxiliary means, on the one hand:
to determine the direction of arrival of each incident wave by the antennas, and on the other hand
to carry out another technical analysis of each incident wave.

Preferably, each delay $\tau_i$ of each delay line, i varying between 1 and N may be defined such that:

$$\tau_{i+1} \geq \tau_i + \text{Max}(LI + \tau_{prop}),$$

where:
LI is the width of the pulse considered, delayed by the delay line of rank i, and
$\tau_{prop}$ is the maximum propagation delay between two antennas.

As a variant, said receiver may be of superheterodyne type and furthermore comprise:
N local oscillators respectively associated with each of the antennas, each local oscillator being able to generate a local-wave signal having its own frequency, and
N mixers respectively coupled between the output of each antenna and the input of the corresponding delay line, and able to receive the local wave of the local oscillator associated with the antenna considered, each mixer being able to frequency shift by a shift $\Delta f_i$, the pulse delivered by the antenna considered, of the value of the frequency of the local wave delivered by the local oscillator considered.

Preferably, said measurement means may then be able to frequentially separate each pulse included within the output signal of the coupling means.

Preferably, each frequency shift may then be defined such that:

$$\Delta f_{i+1} \geq \Delta f_i + \Delta f_{spectrum}, \text{ where}$$

$\Delta f_i$ is the frequency shift carried out on the output signal of the mixer of rank i, and
$\Delta f_{spectrum}$ is the width of the spectrum of the signals implemented by said system.

For example, the system may be of instantaneous wideband type.

As a variant, the system may be of restricted instantaneous band type.

According to another aspect of the invention, there is proposed a use of a system such as mentioned hereinabove to perform goniometry.

BRIEF DESCRIPTION OF THE DRAWINGS

Other advantages and characteristics of the invention will be apparent on examining the detailed description of wholly non-limiting embodiments of the invention, and the appended drawings in which.

DETAILED DESCRIPTION

Figure 1:
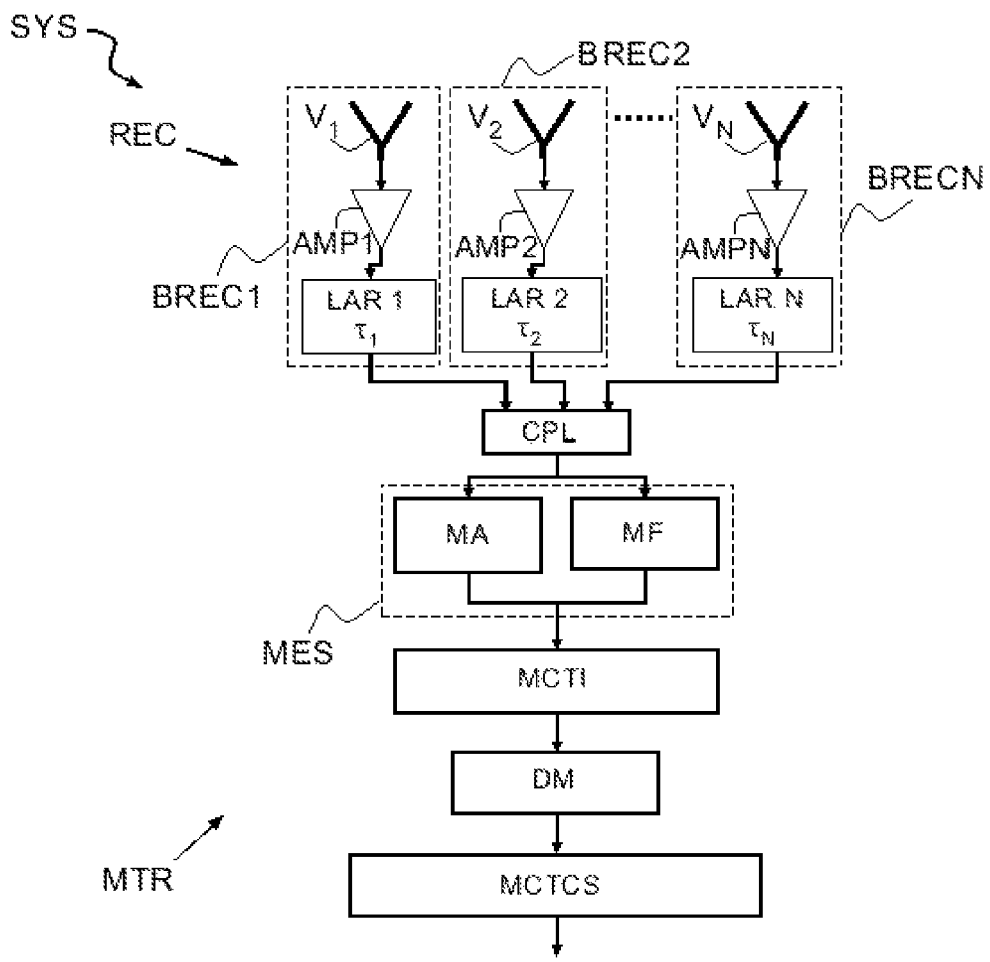
FIG. 1 illustrates a first embodiment of the invention.

FIG. 1 is referred to. The reference SYS designates a multichannel reception system according to a first embodiment of the invention. Here the system SYS is an instantaneous wideband system which is one-piece so as to simplify the architecture of the system.

The system SYS comprises a receiver REC coupled to a processing means MTR.

The receiver REC comprises N reception blocks BREC1, ..., BRECN, N being an integer. Each reception block BREC1, ..., BRECN comprises an antenna respectively referenced $V_1, ..., V_N$. The antennas $V_1, ..., V_N$ are in this example equidistant. Each antenna $V_1, ..., V_N$ is able to pick up a signal representative of incident waves.

In this example it is considered that each signal picked up by an antenna is a brief pulse.

The output of each antenna is linked to an amplifier, respectively referenced AMP1, ..., AMPN.

Each amplifier AMP1, ..., AMPN is able to amplify the pulse delivered by the antenna to which it is coupled. The pulse amplified by an amplifier AMPi, i varying between 1 and N, is referenced $s_i(t)$ in FIG. 2. Each pulse has its own arrival time and amplitude, because the antennas $V_1, ..., V_N$ are differently sited and oriented in space.

FIG. 1 is referred to again. The output of each amplifier AMP1, ..., AMPN is respectively coupled to a delay line LAR1, ..., LARN. The role of this delay line is to delay the amplified pulse by a chosen delay, $\tau_i$. This delay is defined in greater detail hereinafter.

Figure 2:
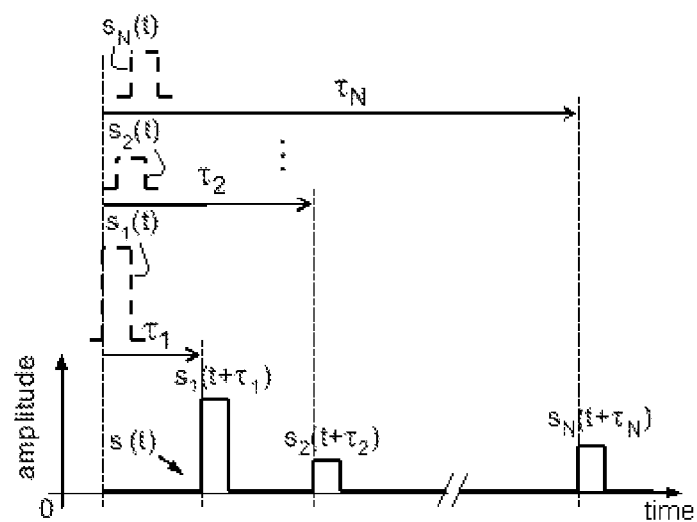
FIG. 2 represents signals implemented by the embodiment of FIG. 1.

The outputs of the set of delay lines are coupled to the processing means MTR and more particularly linked to a coupler CPL incorporated within the processing means MTR. The function of the latter is to sum the delayed pulses so as to form and deliver one single signal. Stated otherwise, the delay lines LAR1, ..., LARN and the coupler CPL make it possible to carry out a temporal multiplexing according to the delays $\tau_i$. This signal s(t) is represented in FIG. 2. It is formed of N pulses temporally sequenced in series.

In order for the pulses not to overlap at the moment of the coupling, the delay $\tau_i$ inserted by each delay line must preferably adhere to the condition hereinbelow:

$$\tau_{i+1} \geq \tau_i + \text{Max}(LI + \tau_{prop}),$$

where:
LI is the width of the pulse considered, delayed by the delay line of rank i, and
$\tau_{prop}$ is the maximum propagation delay between two antennas.

The propagation time $\tau_{prop}$ is related to the shift in space of one antenna with respect to the other within the system.

In this way, the temporal integrity of each pulse is safeguarded.

FIG. 1 is referred to again.

By way of example, the delay lines LAR1, ..., LARN and the coupler CPL may be produced with the aid of hyper-optical transformation devices, well known to the person skilled in the art. The advantage of this type of device for the delay lines LAR1, ..., LARN is the ability to implement high delays easily. Furthermore they give rise to few losses in the processed signals and are not very bulky.

The signal formed by the coupler CPL is delivered to a measurement means MES. There is just a single one of the latter for the set of N delayed pulses delivered by the delay lines LAR1, ..., LARN.

A role of the measurement means MES is to deliver, as output, samples of measurements in series pertaining to the input signal.

Accordingly, the measurement means MES comprises two modules:
a means for analyzing the amplitude MA, and
a means for analyzing the frequency MF.

The function of the means for analyzing the amplitude MA is to measure the power of each pulse of the input signal. This may be carried out by means of a quadratic detector (it may be effected very simply with the aid of a diode). The quadratic detector delivers a voltage proportional to the power of the input signal.

The function of the means for analyzing the frequency MF is to determine the frequency of emission of the pulses.

The output of the measurement means MES is coupled to the input of a means for technical characterization of the pulses MCTI.

The latter is able to technically analyze each pulse on the basis of the amplitude and frequency measurement samples) delivered periodically by the measurement means MES. It delivers as output.

Conventionally, so-called primary parameters of each pulse are delivered, with the exception of the direction of arrival, since the latter requires above all that the string of pulses originating from the same incident wave be recovered. Included among these primary parameters are therefore for example, the power of the pulse, the frequency of the carrier of the pulse, the arrival date of the pulse, the width of the pulse, and subject to an intra-pulse characterization, the spectral spreading of the pulse, its frequency-evolution profile, its amplitude-evolution profile. Of course, this list is non-exhaustive.

An auxiliary means DM is coupled at the output of the means for technical characterization of the pulses MCTI. This auxiliary means DM is able to carry out on the one hand a demultiplexing and on the other hand a correlation of the signal that it receives as input.

The demultiplexing of the data makes it possible to group the technical analyses of the pulses belonging to one and the same wave picked up in parallel by several antennas and arising from the temporal multiplexing with the aid of the delays $\tau_i$. According to the type of antenna array and the power picked up by each antenna, in particular in the case of a circular array (antennas pointed in different directions), on completion of the grouping effected by the auxiliary means will not necessarily give N technical analyses of pulses.

The grouping of the pulse technical analyses by the auxiliary means DM is done:
over a time window which does not exceed the largest of the delay deviations, i.e. Max($\tau_i-\tau_j$), (i≠j, and (i,j)ϵ[1, ..., N]), by resemblance of the stable technical parameters, that is to say those which do not depend on the antennal array and on the direction of arrival of the wave at the array.

For example, for a circular antenna array, the grouping is based on the frequency of the emission, its pulse width, and optionally its intra-pulse characterization. These are easily obtained by processing procedures known to the person skilled in the art using notably tolerances to take account of the measurement errors made.

More precisely, the demultiplexing carried out by the auxiliary means DM (that is to say the association of the N pulses arising from the N antennas and corresponding to the same intercepted wave) is done by correlation.

The latter can only be done in respect of characteristics that are invariant in each of the N pulses and in respect of the recognition of their inter-delay law. The characteristics that are invariant on the N pulses are those which are specific to the wave, independently of any geometric consideration related to the antenna array and to its illumination by the incident wave. Thus the power, the arrival date and the phase of the pulses are not invariants, but are carrier characteristics, respectively different relative illuminations due to the radiation patterns and to the path length differences.

The general principle of the demultiplexing is effected by the grouping (or sorting) of the pulses, based on the similarity of their primary parameters (the invariants) and the similarity of the relative distribution of the arrival dates with respect to the distribution of the delays intentionally induced by the delay lines LARi.

These delays induced by the delay lines LARi being perfectly defined and known, they make it possible to perform this grouping merely by analyzing the pulses belonging to a sliding time window, limited to the maximum delay between channels.

Accordingly, mathematical operations are carried out for comparing values of quantities of like nature. As these values arise both from measurements and from hardware definitions, it is appropriate to carry out the comparisons while taking account of tolerances related, respectively, to the measurement errors and to the hardware definitions. These operations are conventional in functions for fusion, classification, tracking, etc.

It is noted that for the case of the frequency shift, the frequency is no longer an invariant, and that the frequency grouping can only be done by recognition of the frequency shift law. There is then a frequency sliding window.

Moreover, if the time shift and the frequency shift are used jointly, then the sliding correlation window is both in respect of time and in respect of frequency.

Finally, a means for consolidated and goniometric technical characterization of the pulses MCTCS is coupled at the output of the auxiliary means DM. The function of the latter is to estimate on the basis of the technical analyses (N at the maximum) delivered by the auxiliary means DM:
on the one hand, the direction of arrival (goniometric) of the incident waves, and
on the other hand, new technical parameters that are more accurate (since they arise from several measurements) characterizing the incident waves received by the antennas $V_1, \ldots, V_N$.

Figure 3:
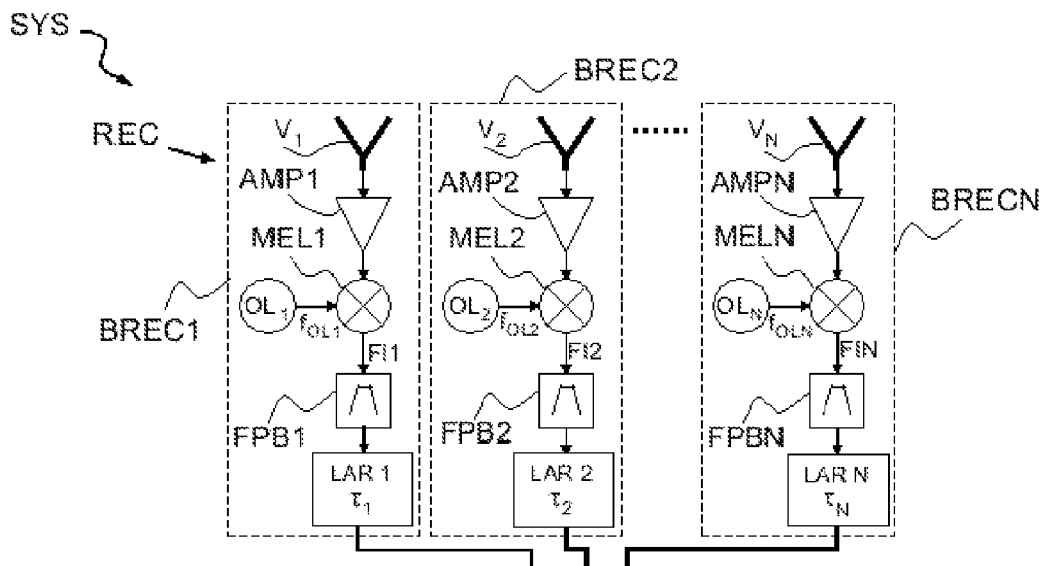
FIG. 3 illustrates a second embodiment of the invention.

FIG. 3 is now referred to, where the reference SYS designates another embodiment of the invention.

The modules having the same references as in FIG. 1 have, unless indicated otherwise, the same function as them.

The receiver REC considered is of superheterodyne type, that is to say it makes it possible to restrict the frequency band to a value acceptable by a spectral analyzer, which will be able to separate the signals by frequency, as explained in greater detail hereinafter. The advantage of this type of receiver is that it is particularly stable in frequency.

In addition to the delay lines LAR1, ..., LARN making it possible to temporally multiplex the pulses received, each reception block REC1, ..., RECN of this new embodiment comprises a set of local oscillators $OL_1, \ldots, OL_N$.

Each local oscillator $OL_1, \ldots, OL_N$ is respectively coupled to the input of a mixer MEL1, ..., MELN, the other input of the latter receiving the output of an amplifier AMP1, ..., AMPN.

More precisely, each local oscillator $OL_1, \ldots, OL_N$ delivers a signal at a given frequency $f_{OL1}, \ldots, f_{OLN}$ so as to frequency multiplex the amplified pulse delivered by the corresponding amplifier AMP1, ..., AMPN.

At the output of the mixer MEL1, ..., MELN, each pulse is shifted in frequency and by intermediate frequency FI1, ..., FIN, is filtered by a bandpass filter FPB1, ..., FPBN, identical on the N channels so as to
- on the one hand restrict the band conveyed to the rest of the system, and
- on the other hand, retain only the product desired on exiting the mixer.

Figure 4:
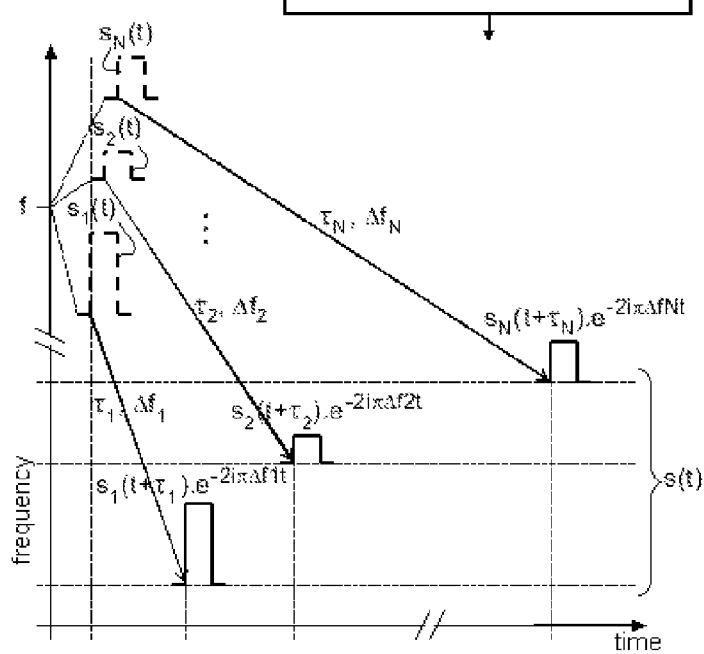
FIG. 4 represents signals implemented by the embodiment of FIG. 3.

Thus, at the output of the coupler CPL, as represented in FIG. 4, the signal s(t) delivered is formed of pulses $s_i(t+\tau_i) \cdot e^{-2i\pi\Delta f_i t}$, shifted in time and in frequency (i lying between 1 and N). It is noted that $\Delta f_i$ represents the frequency deviation between the initial value of the frequency of the pulse of rank i, $s_i(t)$, and the value of the final frequency after multiplexing with the aid of the local oscillator $OL_i$.

It is pointed out that it is preferable that the following operating criterion be adhered to, so as to safeguard the spectral integrity of the signals considered:

$$\Delta f_{i+1} \geq \Delta f_i + \Delta f_{spectrum}, \text{ where}$$

$\Delta f_i$ is the frequency shift carried out on the output signal of the mixer of rank i, and $\Delta f_{spectrum}$ is the width of the spectrum of the signals received by the system SYS.

FIG. 3 is referred to again. The measurement means MES is here formed of a spectral analyzer. Conventionally, a spectral analyzer is formed of a filter bank able to separate each pulse according to the frequency band to which it belongs.

Moreover, the auxiliary means DM preferably works on a time-frequency window defined according to the largest of the deviations of delays and of the deviations of frequency shifts, i.e.:

$$[\text{Max}(\tau_i-\tau_k), \text{Max}(\Delta f_i-\Delta f_k)].$$

The local oscillators $OL_1, \ldots, OL_N$ may be formed by those conventionally incorporated within the receivers of superheterodyne type.

It is noted that as a variant, it is possible to associate a detection threshold with each antenna, so as to consider only the signals received whose power exceeds the detection threshold.

The invention claimed is:

1. A reception system comprising a receiver coupled to a processing means, the receiver comprising a number N of antennas, each antenna picking up signals representative of incident waves and delivering a pulse dependent on said signal, N being an integer, said receiver comprising:
    N delay lines respectively coupled to each of said N antennas, each delay line delaying the signal delivered by the antenna with which it is associated, by its own time delay; and
    coupling means to sum the N signals delivered by the N delay lines to deliver an output signal comprising a series of N time-shifted pulses;
    wherein the processing means comprises measurement means to measure the signal delivered by the coupling means and to deliver as output a signal formed by measurement samples, representative of the N pulses delivered by the N antennas, and
    wherein each delay $\tau_i$ of each delay line, i varying between 1 and N is defined such that:

$$\tau_{i+1} \geq \tau_i + \text{Max}(LI+\tau_{prop}),$$

where:
    LI is a width of the pulse considered, delayed by the delay line of rank i, and
    $\tau_{prop}$ is a maximum propagation delay between two antennas.

2. The system as claimed in claim 1, in which said processing means further comprises:
    means for technical characterization of the pulses, coupled at the output of the measurement means, to technically analyze each pulse based on the measurement samples; and
    auxiliary means to group together the technical analysis signals delivered by the means for technical characterization corresponding to one and the same incident wave.

3. The system as claimed in claim 2, in which the processing means further comprises means for consolidated and goniometric technical characterization of the pulses, based on the grouped technical analyses, delivered by said auxiliary means:
    to determine a direction of arrival of each incident wave by the antennas, and
    to carry out another technical analysis of each incident wave.

4. The system as claimed in claim 1, in which said receiver is of superheterodyne type and further comprises:
    N local oscillators respectively associated with each of the antennas, each local oscillator generating a local-wave signal having its own frequency; and
    N mixers respectively coupled between the output of each antenna and an input of the corresponding delay line, and receiving the local wave of the local oscillator associated with the antenna considered, each mixer frequency shifting by a shift $\Delta f_i$, the pulse delivered by the antenna considered, of the value of the frequency of the local wave delivered by the local oscillator considered.

5. The system as claimed in claim 4, in which said measurement means frequentially separates each pulse included within the output signal of the coupling means.

6. The system as claimed in claim 4, in which each frequency shift is defined such that:

$$\Delta f_{i+1} \geq \Delta f_i + \Delta f_{spectrum}, \text{ where}$$

$\Delta f_i$ is the frequency shift carried out on the output signal of the mixer of rank i, and $\Delta f_{spectrum}$ is a width of the spectrum of the signals implemented by said system.

7. The system as claimed in claim 1, being of instantaneous wideband type.

8. The system as claimed in claim 1, being of restricted instantaneous band type.

9. The use of the system as claimed in claim 1 to perform goniometry.

* * * * *